(12) United States Patent
Rickman et al.

(10) Patent No.: US 10,317,620 B2
(45) Date of Patent: Jun. 11, 2019

(54) INTERPOSER BEAM EXPANDER CHIP

(71) Applicant: ROCKLEY PHOTONICS LIMITED, Marlborough (GB)

(72) Inventors: Andrew George Rickman, Marlborough (GB); Aaron Zilkie, Pasadena, CA (US); Damiana Lerose, Pasadena, CA (US); Gerald Cois Byrd, Shadow Hills, CA (US)

(73) Assignee: ROCKLEY PHOTONICS LIMITED, London (GB)

( * ) Notice: Subject to any disclaimer, the term of this patent is extended or adjusted under 35 U.S.C. 154(b) by 229 days.

(21) Appl. No.: 14/789,489

(22) Filed: Jul. 1, 2015

(65) Prior Publication Data
US 2017/0003450 A1    Jan. 5, 2017

(51) Int. Cl.
*G02B 6/12* (2006.01)
*G02B 6/42* (2006.01)
(Continued)

(52) U.S. Cl.
CPC ......... *G02B 6/12004* (2013.01); *G02B 6/122* (2013.01); *G02B 6/30* (2013.01); *G02B 6/12002* (2013.01)

(58) Field of Classification Search
CPC ...... G02B 6/12004; G02B 6/30; G02B 6/122; G02B 6/1228; G02B 6/136; G02B 6/305
(Continued)

(56) References Cited

U.S. PATENT DOCUMENTS 5,259,049 A    11/1993    Bona et al.
5,703,895 A    12/1997    Ghirardi et al.
(Continued)

FOREIGN PATENT DOCUMENTS

EP    2 535 749 A1    12/2012
EP    2 549 328 A1    1/2013
(Continued)

OTHER PUBLICATIONS

UKIPO Search Report for Application No. GB1512931.5, dated Oct. 20, 2015, 2 pages.
(Continued)

*Primary Examiner* — Kaveh C Kianni
*Assistant Examiner* — Hung Q Lam
(74) *Attorney, Agent, or Firm* — Lewis Roca Rothgerber Christie LLP

(57) ABSTRACT

An interposer chip for coupling light between an array of fibers and an array of optical waveguides on a second photonic chip. The interposer chip has an array of V-grooves for aligning the ends of the fibers to corresponding ends of an array of optical waveguides on the interposer chip. Each optical waveguide has a taper with a first end and a second end, the first end being configured to support an optical mode that couples efficiently to the mode of an optical fiber. The taper reduces the vertical mode size, so that the mode supported by the second end of the taper may be efficiently coupled to a 3-micron thick optical waveguide on the second photonic chip. The interposer chip further has a hard stop having a flat surface parallel to the optical waveguides on the interposer chip, at the interface to the second chip. When the interposer chip is flipped and assembled with the second chip, the hard stop abuts against a mounting surface on the second chip, so that optical waveguides on the interposer chip are aligned, in the vertical direction, with optical waveguides on the second chip.

24 Claims, 17 Drawing Sheets

(51) Int. Cl.
*G02B 6/26* (2006.01)
*G02B 6/10* (2006.01)
*G02B 6/122* (2006.01)
*G02B 6/30* (2006.01)

(58) Field of Classification Search
USPC .............................. 385/14, 28, 43, 129–132
See application file for complete search history.

(56) References Cited

U.S. PATENT DOCUMENTS

| | | | |
|---|---|---|---|
| 5,787,214 A | | 7/1998 | Harpin et al. |
| 6,108,478 A | | 8/2000 | Harpin et al. |
| 6,162,653 A | | 12/2000 | Maund |
| 6,266,468 B1 | | 7/2001 | Rickman et al. |
| 6,310,995 B1 | | 10/2001 | Saini et al. |
| 6,356,692 B1 | | 3/2002 | Ido et al. |
| 6,509,139 B1 * | | 1/2003 | Roberts ............... G02B 6/13 385/131 |
| 7,643,710 B1 | | 1/2010 | Liu |
| 8,798,409 B2 | | 8/2014 | Pardo et al. |
| 2001/0031122 A1 | | 10/2001 | Lackritz et al. |
| 2002/0051607 A1 | | 5/2002 | Ido et al. |
| 2004/0114872 A1 | | 6/2004 | Nagai |
| 2005/0129402 A1 | | 6/2005 | Kim et al. |
| 2007/0189688 A1 | | 8/2007 | Dehlinger et al. |
| 2008/0279505 A1 | | 11/2008 | Gill et al. |
| 2010/0314027 A1 | | 12/2010 | Blauvelt et al. |
| 2011/0097033 A1 | | 4/2011 | Su et al. |
| 2012/0093456 A1 | | 4/2012 | Taillaert et al. |
| 2013/0209112 A1 * | | 8/2013 | Witzens ............... G02B 6/2813 398/214 |
| 2015/0010266 A1 | | 1/2015 | Webster et al. |
| 2015/0055912 A1 * | | 2/2015 | Kachru ................ G02B 6/136 385/14 |
| 2015/0219853 A1 | | 8/2015 | Kumar et al. |

FOREIGN PATENT DOCUMENTS

| | | |
|---|---|---|
| WO | WO 02/075387 A2 | 9/2002 |
| WO | WO 2011/044090 A2 | 4/2011 |
| WO | WO 2012/049273 A1 | 4/2012 |

OTHER PUBLICATIONS

UKIPO Search Report for Application No. GB1512931.5, dated Sep. 2, 2015, 5 pages.
International Search Report and Written Opinion of the International Searching Authority, dated Sep. 28, 2016, Corresponding to PCT/GB2016/052006, 12 pages.

* cited by examiner

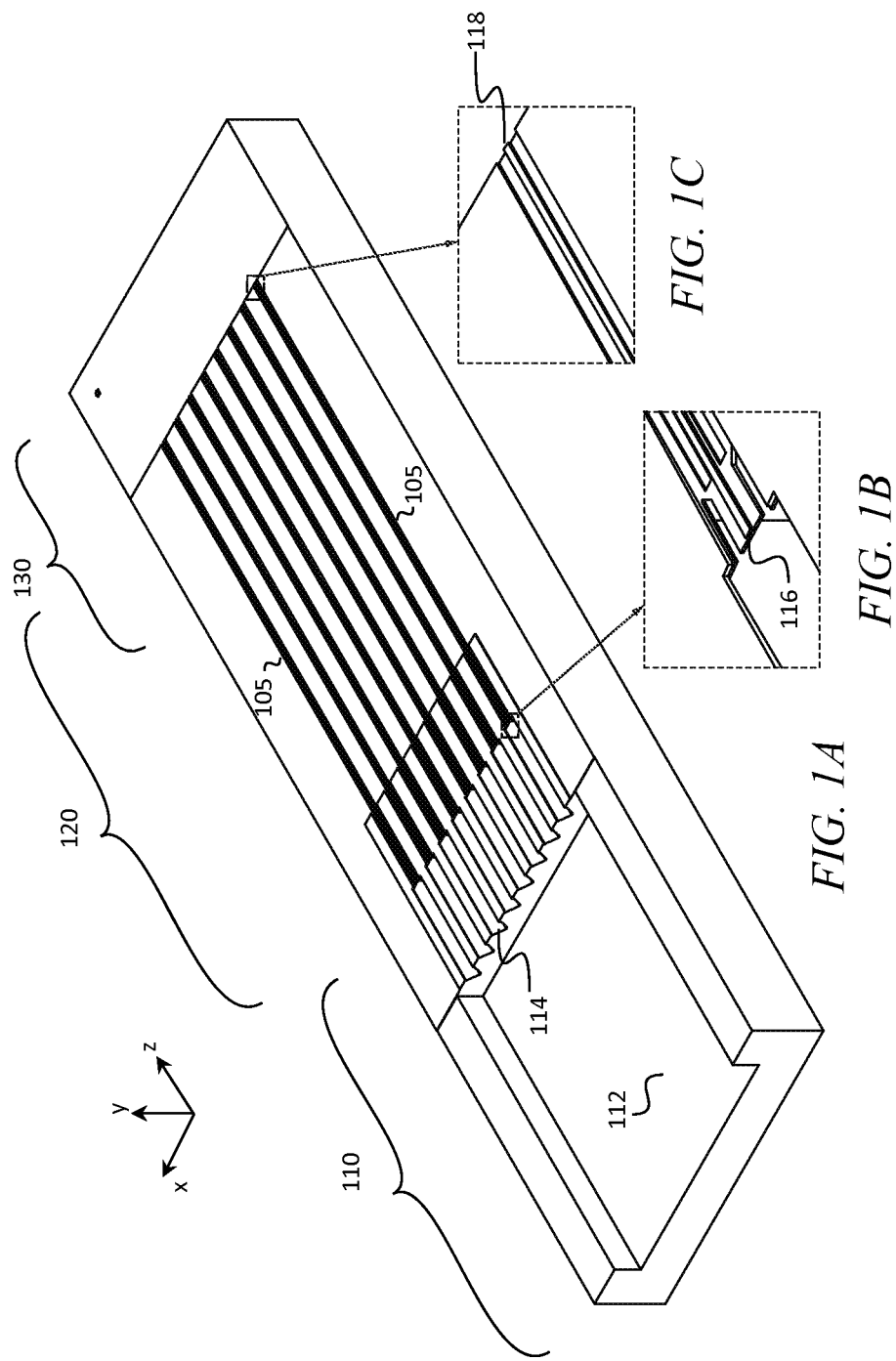

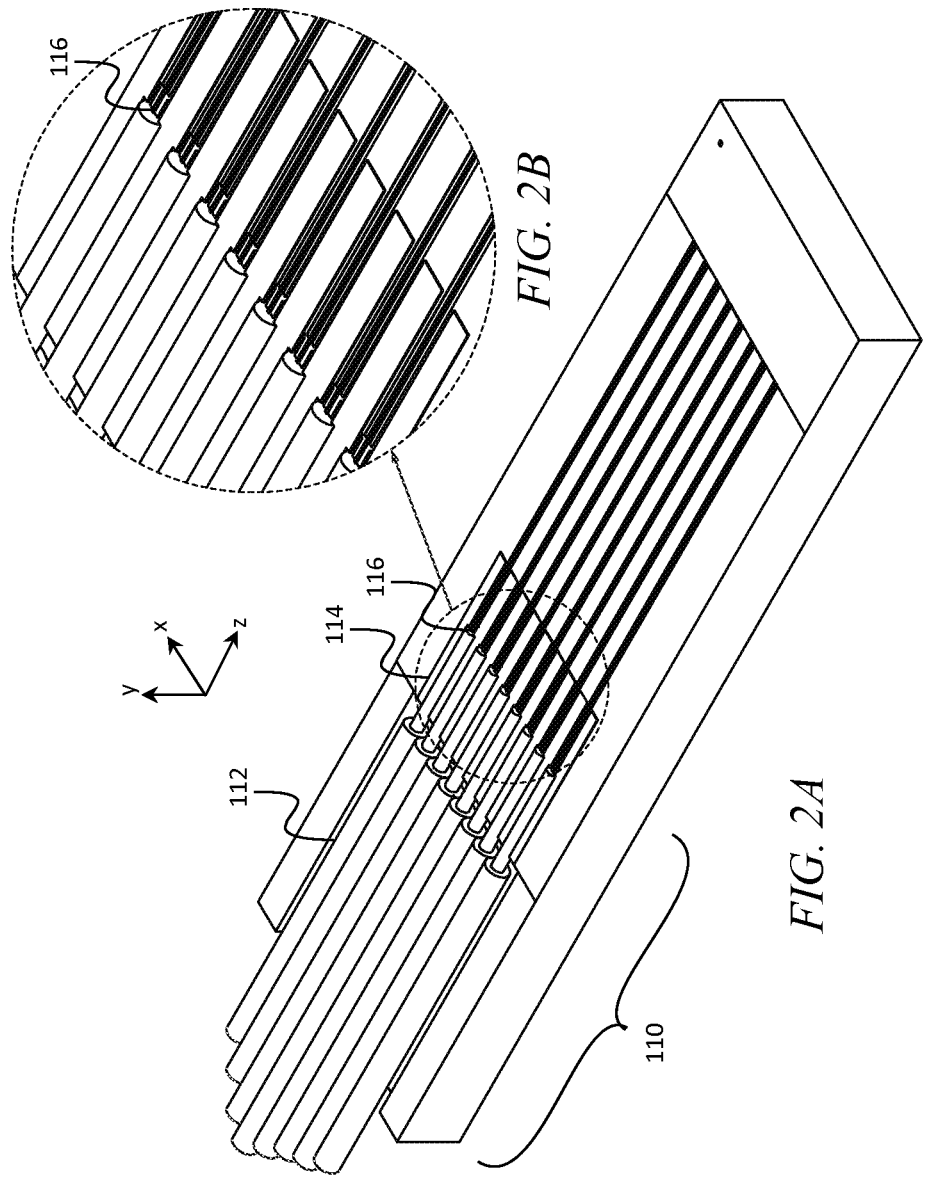

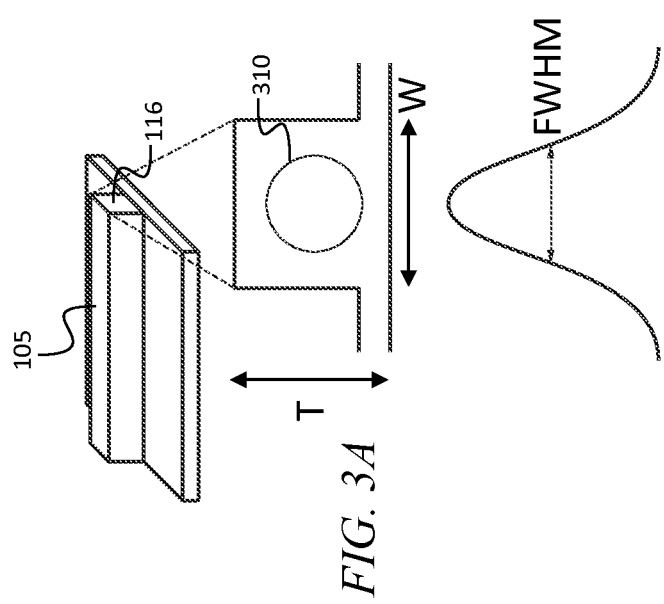
FIG. 3A
FIG. 3B
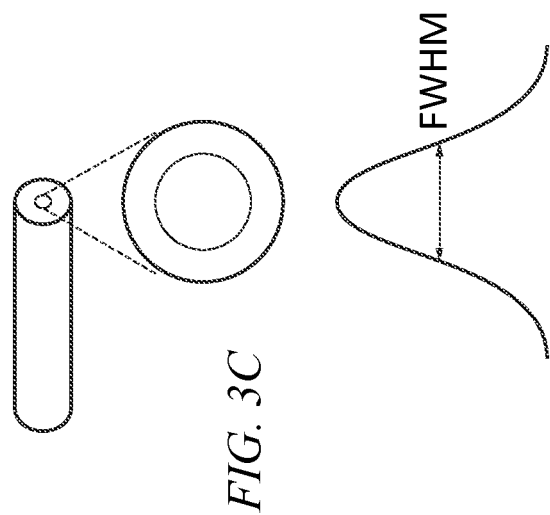
FIG. 3C
FIG. 3D

INTERPOSER BEAM EXPANDER CHIP

FIELD

One or more aspects of embodiments according to the present invention relate to optical waveguides on a substrate and more particularly to systems for coupling light into or out of such optical waveguides.

BACKGROUND

To interact with other components, a photonic integrated circuit may be designed to transmit light to, or receive light from, such other components. On the photonic integrated circuit, light may travel in modes guided by optical waveguides. Efficient coupling into or out of such a mode may require changes in mode size or shape, and may also require careful alignment, which may increase the cost of assembly. Thus, there is a need for an inexpensive system and method for efficient optical coupling to optical waveguides in a photonic integrated circuit.

SUMMARY

Aspects of embodiments of the present disclosure are directed toward an interposer chip for coupling light between an array of fibers and an array of optical waveguides on a second photonic chip. The interposer chip has an array of V-grooves for receiving fibers and hence aligning the ends of the fibers to corresponding ends of an array of optical waveguides on the interposer chip. Each optical waveguide has a taper with a first end and a second end, the first end being configured to support an optical mode that couples efficiently to the mode of an optical fiber. The taper reduces the vertical mode size, so that the mode supported by the second end of the taper may be efficiently coupled to a 3-micron thick optical waveguide on the second photonic chip. The interposer chip further has a hard stop having a flat surface parallel to the optical waveguides on the interposer chip, at the interface to the second chip. When the interposer chip is flipped and assembled with the second chip, the hard stop abuts against a mounting surface on the second chip, so that optical waveguides on the interposer chip are aligned, in the vertical direction, with optical waveguides on the second chip.

According to an embodiment of the present invention there is provided a photonic chip, including: an optical waveguide on a top surface of the photonic chip, the optical waveguide having: a first end configured to support a first optical mode having a first mode center; a second end configured to support a second optical mode having a second mode center; and a first tapered portion, the first tapered portion including a first tapered mesa and a tapered central ridge; and a hard stop including a flat surface parallel to a portion of the waveguide at the second end of the waveguide, the height of the second mode center above the flat surface of the hard stop being greater than zero and less than the thickness of the optical waveguide at the second end.

In one embodiment, the flat surface of the hard stop has an area of at least 0.5 mm².

In one embodiment, the flat surface of the hard stop is a single rectangular area.

In one embodiment, the second end of the optical waveguide has a thickness of about 3 microns.

In one embodiment, the second end of the optical waveguide has a width of about 13 microns.

In one embodiment, the first end and/or the second end of the optical waveguide includes a flat facet, the angle between a normal vector of the facet and the direction of the optical waveguide, at the second end of the optical waveguide, being between 3 and 10 degrees.

In one embodiment, the facet is perpendicular to the top surface of the photonic chip.

In one embodiment, the photonic chip includes an alignment feature, the alignment feature being a recessed feature in the hard stop.

In one embodiment, the photonic chip includes a V-groove at the first end of the optical waveguide, the V-groove being configured to secure and support the cladding of an optical fiber such that a centerline of the optical fiber is substantially aligned with the first mode center.

In one embodiment, the photonic chip includes a cantilevered extension supporting the first end of the optical waveguide above a sloping end surface of the V-groove.

In one embodiment, the first end of the optical waveguide includes a T-bar, the T-bar having the same thickness as the optical waveguide, and being composed of the same material as the optical waveguide.

In one embodiment, the photonic chip includes two tines configured to act as fiber stops.

In one embodiment, the first tapered portion has a first end and a second end, the first end of the first tapered portion being nearer than the second end of the first tapered portion to the first end of the optical waveguide; and the tapered central ridge has a width that decreases from a first width at the first end of the first tapered portion to near zero at the second end of the first tapered portion.

In one embodiment, the first tapered mesa has a width that decreases from a second width at the first end of the first tapered portion to a third width, less than the second width, at the second end of the first tapered portion.

In one embodiment, the first end of the first tapered portion is configured to support an optical mode with a vertical mode size of about 8 microns and a horizontal mode size of about 8 microns.

In one embodiment, the photonic chip includes a second tapered mesa.

In one embodiment, the second tapered mesa has a width that increases from the first end of the second tapered portion to the second end of the second tapered portion.

According to an embodiment of the present invention there is provided an assembly including: a first photonic chip having a top surface including a first optical waveguide having a first end; and a second photonic chip having a top surface including a second optical waveguide having a first end, the first photonic chip being secured to the second photonic chip, the first photonic chip being substantially parallel to, and overlapping, the second photonic chip, the first photonic chip further including a hard stop having a flat surface parallel to a portion of the first optical waveguide at the first end of the first optical waveguide, and abutting against a region of the top surface of the second photonic chip, the first end of the first optical waveguide being configured to support a first optical mode having a first mode center, the first end of the second optical waveguide being configured to support a second optical mode having a second mode center, a portion of the first optical waveguide at the first end of the first optical waveguide being substantially parallel to a portion of the second optical waveguide at the first end of the second optical waveguide, and the first mode center being substantially aligned with the second mode center.

In one embodiment, the second photonic chip further includes a hard stop having a flat surface parallel to a portion of the second optical waveguide at the first end of the second optical waveguide, and abutting against a region of the top surface of the first photonic chip.

In one embodiment, a gap between; the first end of the first waveguide, and the first end of the second waveguide is wider than a gap between: a boundary between the hard stop of the first photonic chip and the region of the top surface of the first photonic chip, and a boundary between the hard stop of the second photonic chip and the region of the top surface of the second photonic chip.

According to an embodiment of the present invention there is provided a photonic chip, including: an optical waveguide on a top surface of the photonic chip, the optical waveguide having: a first end configured to support a first optical mode having a first mode center, the optical waveguide having a thickness of at least 8 microns at the first end; and a second end having a facet, the optical waveguide having a thickness of no more than 4 microns at the second end; and a polished surface, substantially perpendicular to the top surface and substantially perpendicular to a portion of the optical waveguide at the second end of the optical waveguide, the facet being coplanar with the polished surface.

In one embodiment, the photonic chip includes a V-groove at the first end of the optical waveguide, the V-groove being configured to secure and support the cladding of an optical fiber such that a centerline of the optical fiber is substantially aligned with the first mode center.

In one embodiment, the photonic chip includes a first tapered mesa and a tapered central ridge.

BRIEF DESCRIPTION OF THE DRAWINGS

These and other features and advantages of the present invention will be appreciated and understood with reference to the specification, claims and appended drawings wherein:

FIG. 1A is a perspective view, to scale, of an interposer beam expander, according to an embodiment of the present invention;

FIG. 1B is an enlarged view of a portion of the interposer beam expander of FIG. 1A;

FIG. 1C is an enlarged view of another portion of the interposer beam expander of FIG. 1A;

FIG. 2A is a perspective view, to scale, of an interposer beam expander with an array of optical fibers, according to an embodiment of the present invention;

FIG. 2B is an enlarged view of a portion of the interposer beam expander and the fiber array of FIG. 2A;

FIG. 3A is a perspective view and an end view of an optical waveguide, according to an embodiment of the present invention;

FIG. 3B is an illustration of the mode shape in one dimension of an optical mode supported by the optical waveguide of FIG. 3A;

FIG. 3C is a perspective view and an end view of an optical fiber, according to an embodiment of the present invention;

FIG. 3D is an illustration of the mode shape in one dimension of an optical mode supported by the optical fiber of FIG. 3C;

DETAILED DESCRIPTION

Figure 4:
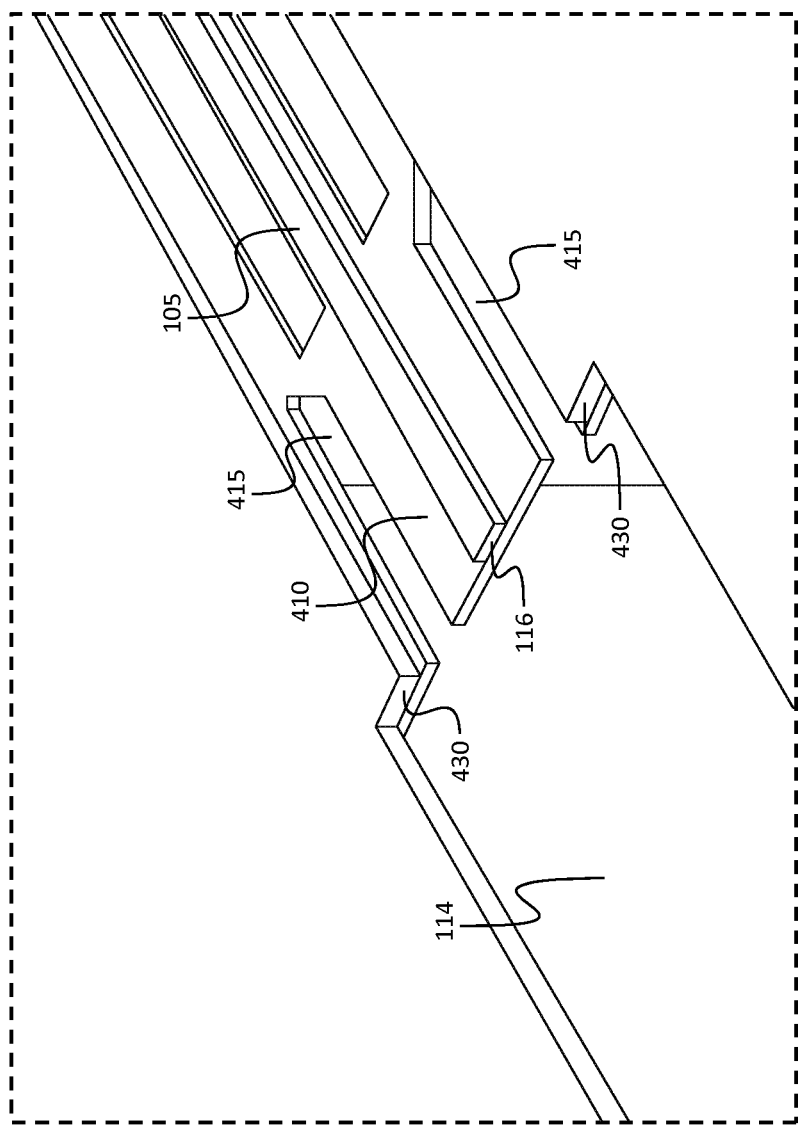
FIG. 4 is a further enlarged view, to scale, of the portion, of FIG. 1B, of the interposer beam expander of FIG. 1A.

The detailed description set forth below in connection with the appended drawings is intended as a description of exemplary embodiments of an interposer beam expander chip provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Referring to FIG. 1A, in one embodiment an interposer beam expander chip includes three sections for coupling light from an array of fibers to an array of optical waveguides 105 on the interposer beam expander chip, and, from there, to a second array of optical waveguides 105 on a second chip (not shown in FIG. 1A). Both the interposer beam expander and the second chip may be photonic chips. As used herein, a "photonic chip" is any part consisting of a substrate having a top surface, and layers, features, and/or devices, including at least one optical waveguide, fabricated on the top surface of the substrate. The surface of the substrate upon which the layers, features, and/or devices are fabricated is referred to herein as the "top surface" even if the photonic chip is inverted or "flipped".

A first section 110 of the interposer beam expander includes a pocket 112 and an array of V-grooves 114 for accommodating an array of fibers. Light from each fiber is coupled into a corresponding optical waveguide 105, having a first set of transverse dimensions and being configured to support a corresponding first optical mode; in a second section 120, an adiabatic taper in the optical waveguide 105 transforms the first optical mode into a second optical mode, and a third section 130 includes features for aligning each optical waveguide 105 to a corresponding optical waveguide on the second chip. The sections 110, 120, 130 may overlap, as illustrated in FIG. 1A. Each optical waveguide 105 extends from a first end that includes a first facet or "fiber-end waveguide facet" 116 to a second end that includes a second facet or "chip-end waveguide facet" 118. FIG. 1B shows an enlarged view of a fiber-end waveguide facet 116, and FIG. 1C shows an enlarged view of the second end of an optical waveguide.

In one embodiment, the interposer beam expander is fabricated on a silicon substrate by forming a 400 nm thick oxide layer (i.e., a layer of $SiO_2$) on the substrate, depositing a 12 micron thick upper layer of silicon on the oxide layer, and performing a series of etching steps to selectively remove material, thereby forming the structures of the interposer beam expander. In a first photolithographic etching step, the thickness of the upper layer of silicon is reduced, in areas exposed to the etchant, by 9 microns, leaving a layer 3 microns thick. This 3 micron thickness refers (as does each reference to thickness herein, unless otherwise specified) to the thickness measured from the top of the oxide layer. In a second etching step, portions of the 3 micron thick areas are further etched to a thickness of 1.8 microns. In a third etching step, portions of the 1.8 micron thick areas are further etched away down to the oxide layer (i.e., to a thickness of zero). V-grooves 114 may be formed using an anisotropic etch such as a potassium hydroxide (KOH) etch or by an etch using any of a group of other suitable etchants known to those of skill in the art. Other etching steps may be used to etch through the oxide layer and into the substrate, for example to form alignment marks.

Referring to FIG. 2A, in one embodiment, an array of fibers is positioned in the first section 110 with the jacket of each fiber extending into the pocket 112 and the cladding of each fiber resting in a respective V-groove 114. Referring to FIG. 2B, the core and cladding of each fiber ends near a respective fiber-end waveguide facet 116, without touching the fiber-end waveguide facet 116. The dimensions and position of each V-groove 114 are such that when the fiber cladding is in contact with both sloping walls of the V-groove 114, the optical mode of the fiber is approximately centered on the optical mode of the adjacent optical waveguide 105. FIG. 3A is an illustration of an optical waveguide 105 having a width W and a thickness T, and supporting an optical mode that has a certain horizontal mode size (FIG. 3B; the horizontal mode size is defined herein as the full width at half maximum (FWHM) of the optical power in the horizontal direction) and a vertical mode size (defined herein as the FWHM in the vertical direction) approximately equal to the horizontal mode size. This mode is depicted by the circle 310. The mode center is defined herein as the point of maximum optical irradiance. The height of the mode center above a reference plane (e.g., the top surface or the bottom surface of the oxide layer) is defined herein as the minimum distance between the mode center and the reference plane.

Referring to FIG. 3C, the dimensions of the optical waveguide 105 may be selected so that the vertical mode size and the horizontal mode size of the first mode are approximately equal to the mode diameter (defined herein as the FWHM in the horizontal or vertical direction) of a second optical mode supported by the fiber. In one embodiment, the optical waveguide 105 has a thickness T of 12 microns and a width W of 12 microns, and supports a second mode with a horizontal mode size and a vertical mode size (FWHM) of 8 microns. The fiber may have a 10 micron core and may support a first mode with a mode diameter of 8 microns. Thus, the two mode diameters may be similar, allowing for efficient coupling of optical power between the fiber and the optical waveguide 105 at the fiber-end waveguide facet 116.

Referring to FIG. 4, in one embodiment, the interposer beam expander includes a cantilevered extension 410 supporting a short portion, of the optical waveguide 105, terminating in the fiber-end waveguide facet 116. This portion of the optical waveguide 105 may have a central ridge with a thickness of 12 microns and a width of 12 microns, and the remainder of the cantilevered extension 410 may have a thickness of 3 microns. Notches 415 on both sides of the cantilevered extension 410 are formed before the anisotropic etch and provide access to the substrate for the V-groove etchant (e.g., KOH) so that the V-groove etch undercuts the cantilevered extension 410 and the blind end of the V-groove 114 is set back from the end of the cantilevered extension 410. As a result, the end of the fiber will not contact the blind end of the V-groove 114 before being sufficiently close to the fiber-end waveguide facet 116 to achieve acceptable coupling between the fiber and the optical waveguide 105. Two fiber stops 430 may be provided, one on the outside of each notch 415; these fiber stops 430 may extend slightly farther than the cantilevered extension 410 so that the fiber end may abut against the fiber stops 430 before contacting the cantilevered extension 410.

During assembly, the jacket and coating may be stripped from the end of each fiber of an array of fibers, and the fiber ends may be cleaved with an array cleaver, and positioned in the array of V-grooves 114. In the coordinate system used herein, the y-axis is perpendicular to the plane of the chip, the local z-axis is the direction of propagation of light, and the x-axis is parallel to the plane of the chip (and perpendicular to the z-axis; see FIG. 2A). Each fiber may be aligned in the x and y directions as a result of the cladding being in contact with the two sloping walls of the V-groove 114. In the z direction, the array of fibers may be aligned as a unit with the array of optical waveguides 105. The clearance between the tip of each fiber and the corresponding fiber-end waveguide facet 116 may be less than about 10 microns for acceptable coupling loss. Alignment in the z direction may be accomplished visually, e.g., by an operator measuring the gap between the fiber tip with a microscope, and using a suitable alignment jig to make fine adjustments to the z-position of the fiber until it is within an acceptable range. An array fiber cleaver may form cleaved ends with a variation in fiber length (i.e., scatter in the locations of the cleaved ends) of about 5 or 10 microns. An entire array of fibers may be aligned as a unit with the interposer beam expander if the variation is within the alignment tolerance of the fiber-end waveguide interface. Contact between the fiber tip and the fiber-end waveguide facet 116 may damage the fiber-end waveguide facet 116 and may be avoided by maintaining a minimum safe clearance, e.g., 1 micron, during the z-alignment procedure. If fiber stops 430 are present, excessive pressure on the fiber stops 430 may damage the fiber stops 430 and may similarly be avoided by maintaining a safe clearance.

Figure 5:
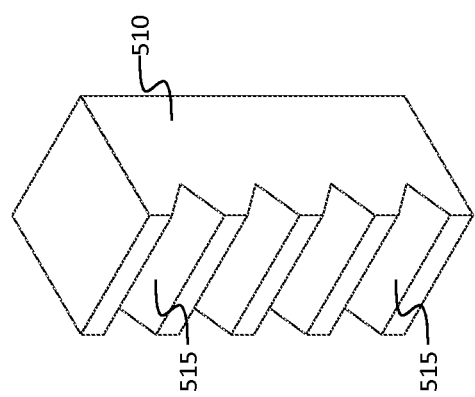
FIG. 5 is a perspective view of a fiber clamp, according to an embodiment of the present invention.

After the fibers are aligned, they may be secured in place with a silicon fiber clamp 510, an exemplary embodiment of which is shown in FIG. 5. The fiber clamp 510 may have a plurality of clamp V-grooves 515 for engaging an array of fibers, or it may instead have a flat surface for bearing against the fibers. The fiber clamp 510 may be secured in place with index-matching gel or adhesive, such as an index-matching epoxy, having an index of refraction similar to that of $SiO_2$. The index-matching gel or adhesive may also be used to fill the gap between the fiber and the fiber-end waveguide facet 116. The fiber-end waveguide facet 116 may have an antireflection coating, e.g., a quarter-wave coating of a material (e.g., silicon nitride) with an index of refraction intermediate to that of the optical waveguide 105 and of the index-matching gel or adhesive. In other embodiments, the fiber-end waveguide facet 116 may be angled, with an angle of between 6 and 10 degrees. The fiber jackets may be secured in the pocket 112 with an adhesive, such as the index-matching epoxy.

Figure 6:
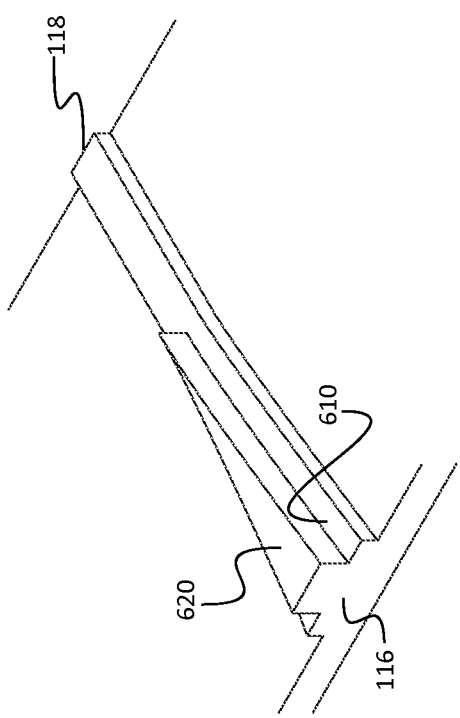
FIG. 6 is a perspective view of an optical waveguide taper, according to an embodiment of the present invention.

The cross-sectional shape and dimensions of each optical waveguide 105 may vary along the length of the optical waveguide 105. In the second section 120, the transverse dimensions of the optical waveguide 105 may change gradually along the length of the optical waveguide 105, to form an adiabatic taper. An exemplary taper is shown in FIG. 6. The taper of FIG. 6 is not drawn to scale; instead, the rate of the taper—which may be imperceptibly gradual in a taper drawn to scale—is exaggerated for clarity. At the wide end (e.g., at the fiber-end waveguide facet 116), the optical waveguide cross section includes a mesa 610 and a central ridge 620. The mesa 610 may be 24 microns wide and 3 microns thick (extending 1.2 microns above the surrounding layer of silicon, which may be 1.8 microns thick), and the central ridge 620 may be 12 microns wide and 12 microns thick (e.g., extending 9 microns above the mesa 610). In other embodiments the central ridge is less than 12 microns thick, e.g., it is 10 microns thick, or 8 microns thick. The wide end of the taper may support an optical mode with approximately equal vertical mode size and horizontal mode size of 8 microns. The width of both the mesa 610 and the central ridge 620 may decrease gradually along the length of the taper, the width of the central ridge 620 decreasing to near zero (e.g., to a width between 100 nm and 1 micron) at an end of the central ridge 620 part-way along the taper or at the end of the taper. A sufficiently gradual taper may reduce the optical loss incurred by light propagating through the taper. In one embodiment the central ridge 620 extends over a length of between 2 mm and 7 mm (e.g., over a length of 5 mm) and the mesa 610 tapers from 24 microns to 13 microns over the same length.

In another embodiment, in a first taper the central ridge 620 tapers from a width of 12 microns to zero, and the width of the mesa 610 tapers from 24 microns down to 3 microns, and, in a second taper, the width of the mesa tapers back up to 13 microns (while the central ridge remains absent). The first taper in this embodiment may be referred to as a 2-dimensional (2D) taper, because the vertical mode size and the horizontal mode size of the optical mode supported by the narrow end of the first taper are both less, respectively, than the vertical mode size and the horizontal mode size of the optical mode supported by the wide end of the first taper. The second taper in this embodiment increases only the horizontal mode size and accordingly may be referred to as a 1-dimensional (1D) taper. The narrower intermediate section of this embodiment may accommodate bends in the optical waveguide 105, as discussed in further detail below. In other embodiments the width of the mesa 610 at the chip-end waveguide facet 118 may be greater than 13 microns or less than 13 microns (e.g., 12 microns). On the cantilevered extension 410 (FIG. 4), at the wide end of the taper, a short section of the mesa 610 may be wider, e.g., it may have the same width as the cantilevered extension 410, to provide mechanical strength to the cantilevered extension 410.

Figure 7:
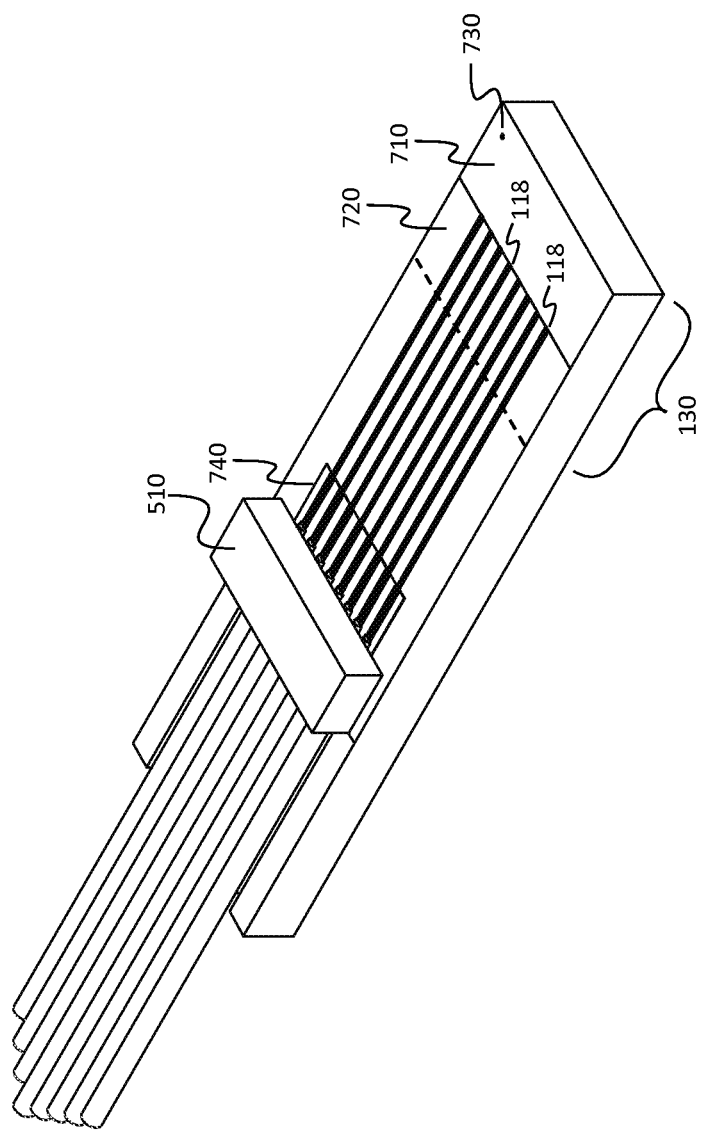
FIG. 7 is a perspective view, to scale, of an interposer beam expander with an array of optical fibers secured by a fiber clamp, according to an embodiment of the present invention.

FIG. 7 shows the interposer beam expander with an array of fibers installed and secured with the fiber clamp 510. Within a thicker region 740, the thickness of the upper layer of silicon is 12 microns on either side of each channel defining a waveguide, so that each central ridge 620 (FIG. 6) has 12 micron thick structures on both sides; as a result the central ridge 620 may be less likely to be damaged during handling.

As also shown in FIG. 7, the third section 130 includes features that aid in aligning the chip-end waveguide facet 118 of each optical waveguide 105 to a corresponding optical waveguide on the second chip. In one embodiment, a region of the third section 130 is etched down to the oxide layer to form a hard stop 710. The flat surface of the hard stop 710 acts as an alignment reference as described in further detail below. Each optical waveguide 105 terminates at the edge of the hard stop 710; the end of each optical waveguide 105 may be square (as illustrated in FIG. 1B) or angled (by between 3 and 10 degrees), so that the normal vector of the end face of the optical waveguide 105 is, for example, 6 degrees from the local z-axis, in the x-z plane. Such an angled facet may be defined by the photomask. Adjacent to the hard stop 710, the interposer beam expander has a mounting surface 720 within which the thickness of the silicon layer is 3 microns except for a channel on each side of each optical waveguide 105, to define the optical waveguide 105 (see FIG. 1B).

Figure 8A:
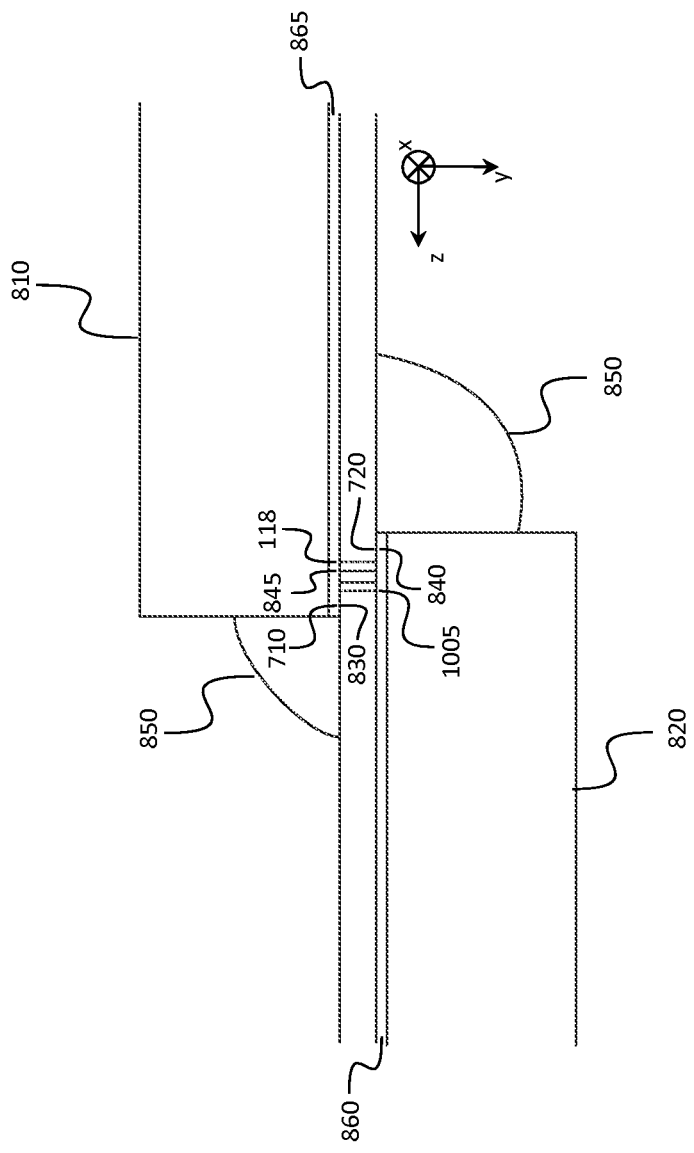
FIG. 8A is a side view of an interposer beam expander secured to a second photonic chip, according to an embodiment of the present invention.

Referring to FIG. 8A, the interposer beam expander may be turned upside down (or "flipped" so that its substrate 810 faces up and its top surface faces down) and placed on a second chip, so that the interposer beam expander partially overlaps the second chip, with the hard stop 710 of the interposer beam expander abutting against a mounting surface 830 of the second chip, and a hard stop 840 of the second chip abutting against the mounting surface 720 of the interposer beam expander. As a result, each optical waveguide 105 of the interposer beam expander is vertically aligned with a corresponding optical waveguide on the second chip, and light may couple efficiently between the two optical waveguides. The top surface of each optical waveguide 105 may abut against the hard stop 840 of the second chip (and the top surface of each optical waveguide of the second chip may abut against the hard stop 710 of the interposer beam expander). If the top surface of the hard stop of the second chip is a 400 nm thick layer of oxide (i.e., a buried oxide, or "BOX" layer) 860, then the penetration of evanescent waves from the optical waveguides 105 through this layer of oxide, and the resulting interaction with the underlying silicon in the second chip, may be sufficiently slight to have a negligible effect on the mode shape in the optical waveguides 105. Similarly, each optical waveguide on the second chip may abut against the oxide (or BOX) layer 865 on the interposer beam expander without significant effect on the mode shape in the optical waveguide.

Both mounting surfaces 720, 830 are free of structures thicker than 3 microns, and a sufficiently large portion of each mounting surface 720, 830 has a thickness equal to 3 microns that when the hard stops 710, 840 are brought into contact with the corresponding mounting surfaces 830, 720, the contact force is sufficiently distributed to avoid damaging structures (e.g., optical waveguides) within the mounting surfaces 720, 830. The substrate 810 of the interposer beam expander and the substrate 820 of the second chip may be secured together with adhesive 850, e.g., with index-matching epoxy.

Figure 8C:
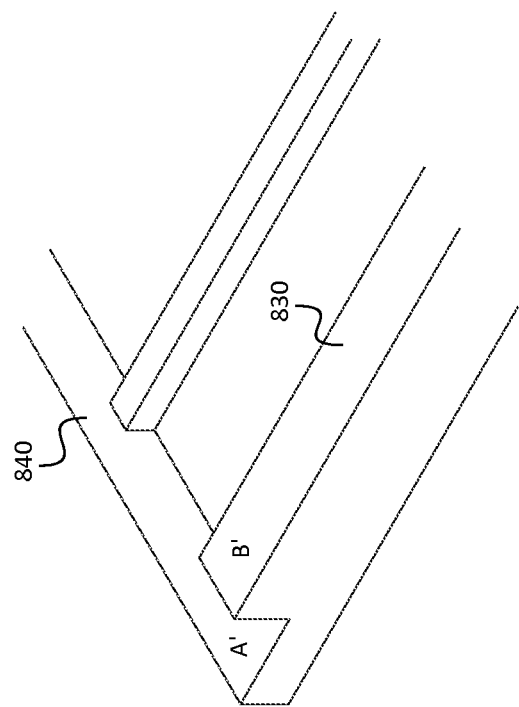
FIG. 8C is a perspective view of a portion of a second photonic chip, according to an embodiment of the present invention.
Figure 8B:
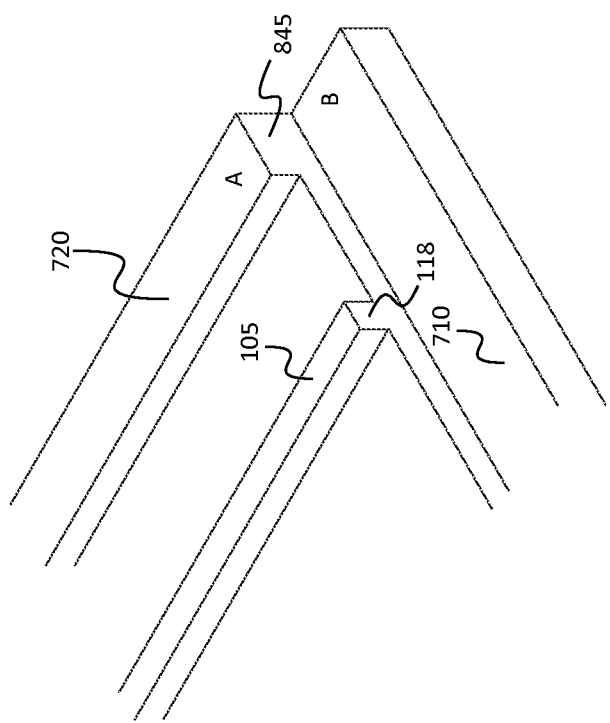
FIG. 8B is a perspective view of a portion of an interposer beam expander, according to an embodiment of the present invention.
Figure 8D:
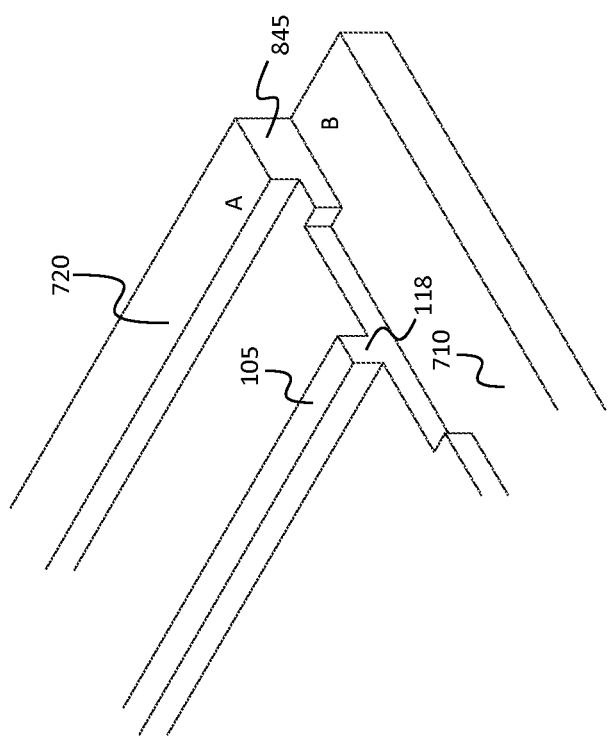
FIG. 8D is a perspective view of a portion of an interposer beam expander, according to another embodiment of the present invention.

FIGS. 8B and 8C show portions of the interposer beam expander and of the second chip, respectively. When the interposer beam expander is flipped and installed on the second chip, surface A of the interposer beam expander abuts against surface A' of the second chip, and surface B of the interposer beam expander abuts against surface B' of the second chip. FIGS. 8B and 8C are not drawn to scale; for example, the width of the mounting surface 720 may be significantly greater than illustrated, to provide sufficient mechanical strength to avoid damage when it is brought into contact with the hard stop 840 of the second chip. FIG. 8D illustrates an embodiment in which the chip-end waveguide facet 118 is set back from the step 845 at the edge of the mounting surface 720 of the interposer beam expander. FIG. 8D is not drawn to scale; for example, the amount by which the waveguide facet 118 is set back from the step 845 may be significantly smaller than that shown.

The hard stops 710, 840 may have approximately the same width (in the z-direction). In other embodiments, one hard stop (and the corresponding mounting surface) may be larger than the other, or one hard stop (and the corresponding mounting surface) may be absent entirely. In one embodiment the width of each hard stop (i.e., the dimension in the z-direction) is 1 mm. The dimensions of the hard stop 710 may be selected to be sufficiently great to provide adequate strength and accuracy for passive alignment in the z direction to be feasible, without occupying more chip area than necessary. In one embodiment the hard stop surface is a rectangle (such as the rectangular surface illustrated in FIG. 7). The rectangle may have x and z dimensions of 1 mm and 0.5 mm respectively; in one embodiment the z dimension is between 0.5 mm and 2 mm. In one embodiment, the flat surface of the hard stop 710 is not a single area but instead includes a plurality of portions that are not contiguous but instead are separated by other structures. Such structures may be optical or electronic components, or they may include grooves, adjacent to the portions of the hard stop surface, which may serve to collect dirt when the hard stop is cleaned prior to assembly, making more effective cleaning possible. In one such embodiment the hard stop surface has a total area of at least 0.5 mm$^2$, and less than 2 mm$^2$.

The chip-end waveguide facet 118 may be set back (e.g., set back between 200 nm and 1 micron) from the step 845 at the edge of the mounting surface 720 of the interposer beam expander (and the waveguide end on the second chip may be similarly set back), so that even if during assembly the edges of the mounting surfaces 720, 830 come into contact with each other, the optical waveguides 105 will not come into contact with each other.

Figure 9:
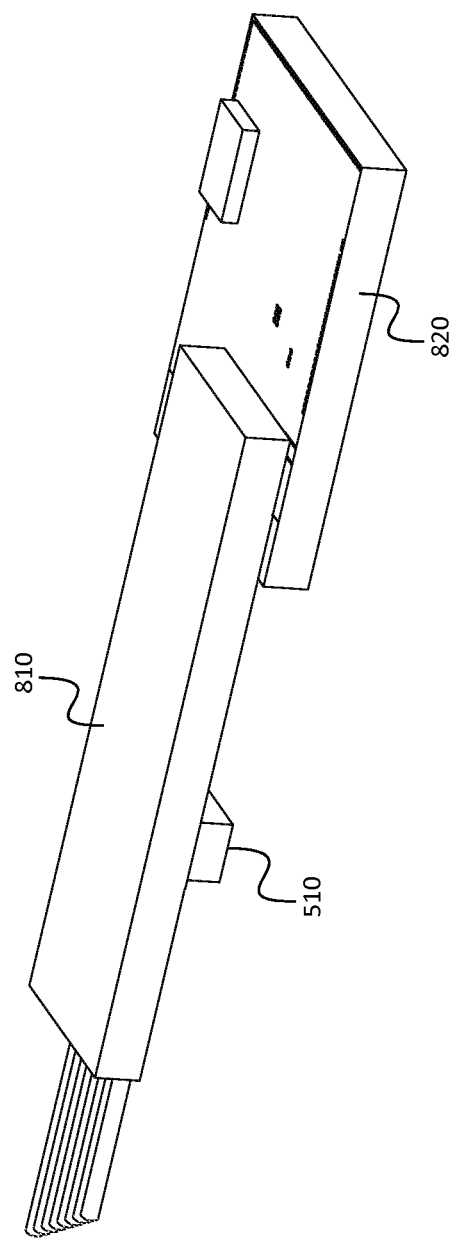
FIG. 9 is a perspective view, to scale, of the interposer beam expander and fibers of FIG. 7, secured to a second photonic chip, according to an embodiment of the present invention.

Alignment features such as alignment marks on the hard stops (such as the alignment mark 730, FIG. 7), may be used for alignment. A machine-vision-based assembly system may be used to align the interposer beam expander with the second chip in the x and z directions, before bringing them into contact and securing them together. In this case alignment marks may serve as reference marks for such an assembly system. The alignment marks may be formed by etching through the oxide layer and into the substrate, in the region of the hard stop 710. In other embodiments, other alignment features, such as mechanical alignment features, may be used. Mechanical alignment features may include, for example, a recessed feature in a hard stop and a corresponding raised feature in a mounting surface, the raised feature being designed to engage the recessed feature, providing passive mechanical alignment in the x and/or z direction, when the hard stop is brought into contact with the mounting surface. As another example, a pair of mechanical alignment features may be a step on the interposer beam expander and a corresponding step on the second chip, configured to abut against each other, and to provide passive mechanical alignment in the x direction or in the z direction, for example. The horizontal mode size at the chip interface may be selected to be sufficiently large that adequate alignment in the x and z directions using alignment marks is readily achievable. The gap between the two steps at the respective edges of the mounting surfaces 720, 830 may be between 1 micron and 2 microns once the two chips are secured together. The size of this gap may be selected so as to allow the machine-vision-based assembly system to bring the parts into contact without allowing the edges of the mounting surfaces 720, 830 to come into contact with each other. FIG. 9 shows the assembly of an interposer beam expander and a second chip.

Figure 10:
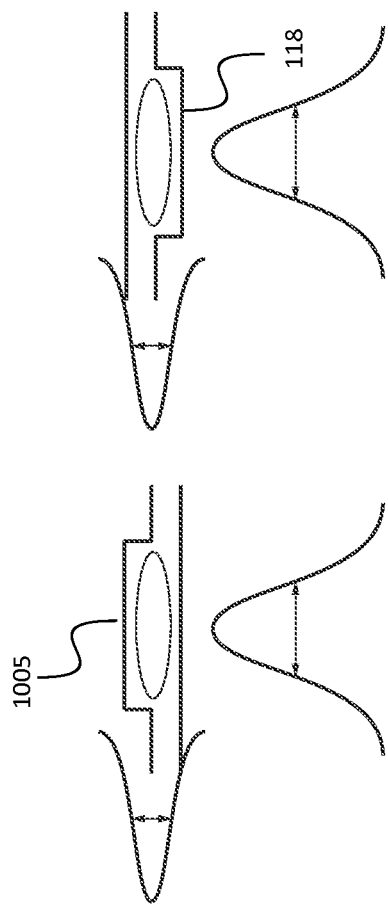
FIG. 10 is an end view of an optical waveguide of the interposer beam expander of FIG. 8A, and an adjacent end view, taken in the opposite direction, of an optical waveguide of the second chip of FIG. 8A, each view showing corresponding mode shapes.

Referring to FIG. 10, as a result of the vertical alignment (i.e., alignment in the y direction) provided by the abutting of the hard stops 710, 840 against the mounting surfaces 830, 720, a waveguide facet 1005 on the second chip has a mode that is at the same height as the mode of a corresponding (inverted) chip-end waveguide facet 118 on the interposer beam expander, and light may couple efficiently from one optical waveguide into the other. The 3 micron height of the waveguide facet on the second chip (made possible by the vertical mode size reduction on the interposer beam expander) may make it unnecessary to have optical waveguide 105 structures taller than a 3 micron thick optical waveguide 105 on the second chip. Such tall structures (e.g., a 12 micron thick central ridge 620) may be challenging to fabricate, especially on a chip with a potentially complex configuration of optical and electronic components.

Figure 11A:
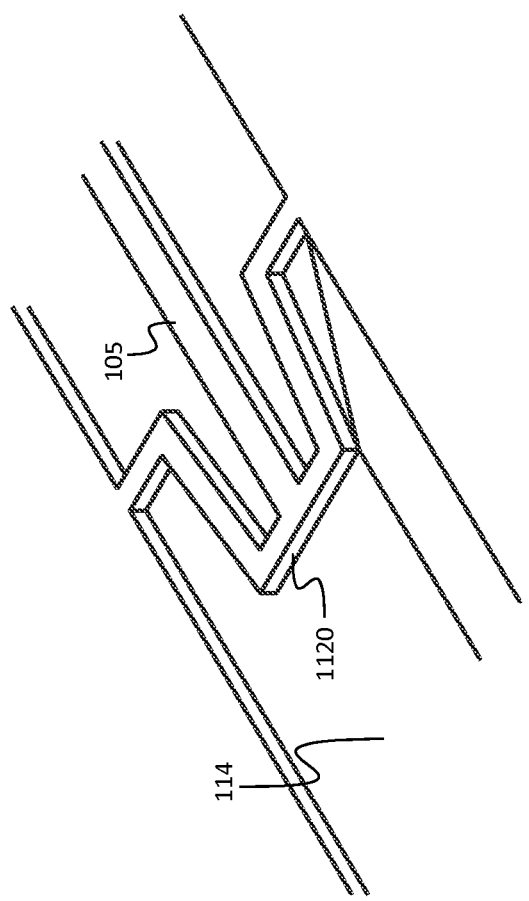
FIGS. 11A-11C are perspective views of a fiber-end waveguide facet according to three respective embodiments of the present invention.
Figure 11B:
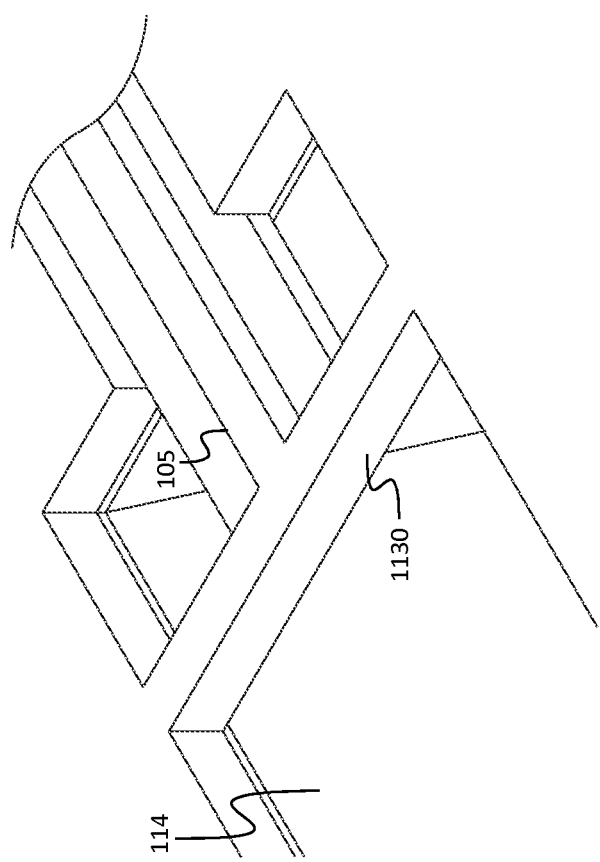
Figure 11C:
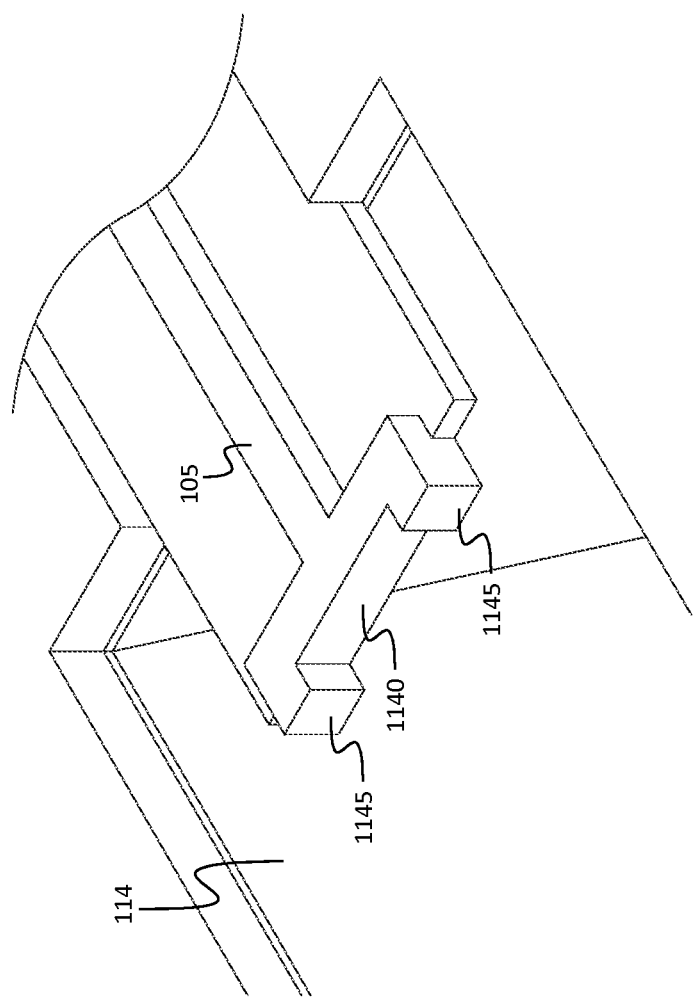
Figure 11D:
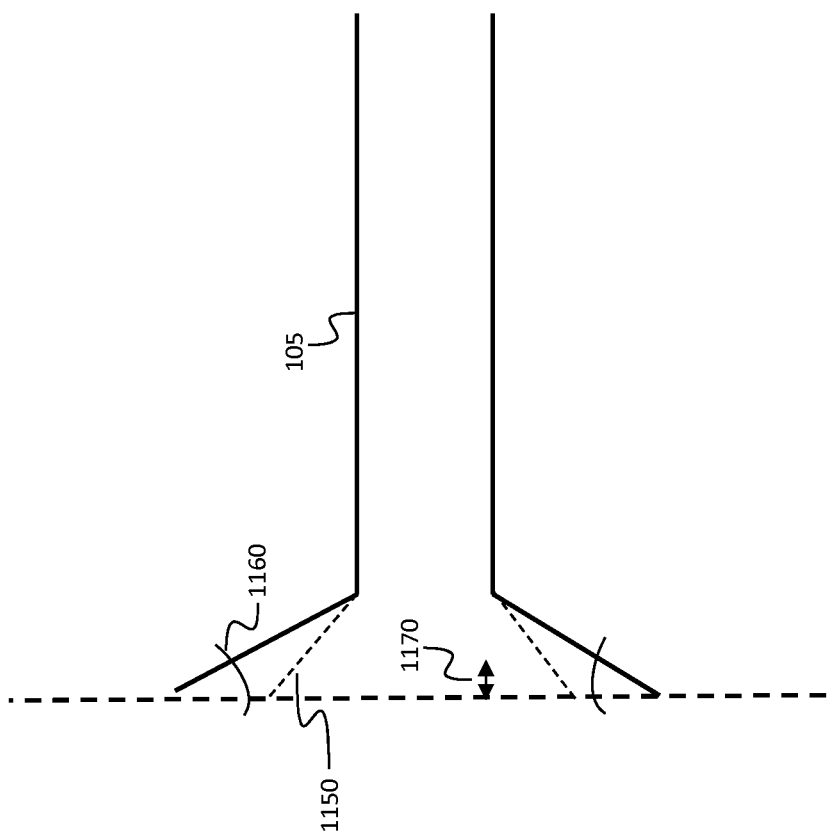
FIG. 11D is a schematic plan view of a fiber-end waveguide facet according to an embodiment of the present invention.

The portion of the optical waveguide at the fiber-end waveguide facet 116 may have the shape shown in FIG. 4, or it may have the shape of a T-bar 1120 (FIG. 11A), a bridge bar 1130 that extends to the walls of the V-groove 114, bridging the V-groove 114 (FIG. 11B), a fork-bar 1140 having two tines the end of each of which acts as a fiber stop 1145 (FIG. 11C), or a flare (FIG. 11D). The embodiments of FIGS. 11A-11D may reduce the effects of corner rounding or similar damage, which may cause additional loss if a fiber-end waveguide facet 116 with a narrow ridge (as shown in FIG. 4) is used. For example, in the embodiment of FIG. 11D, the dimensions and angle of the flare may be selected such that light within the worst case beam diffraction boundary 1150 will be unaffected by even worst case corner rounding 1160 or similar damage. Moreover the flare may be chosen to be substantially longer than the worst case mask alignment error 1170, so that the flare will be formed, with sufficient width to keep corner rounding out of the diffraction boundary 1150, even in the presence of such alignment error. Similar structures may be used at the chip-end waveguide facets 118 to reduce the effects of corner rounding or similar damage at those facets.

Figure 12B:
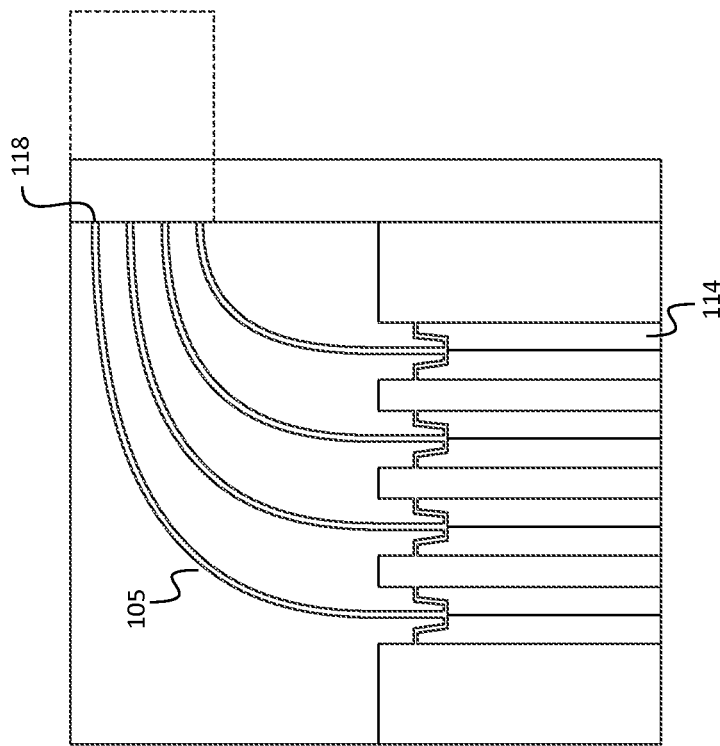
FIG. 12B is a plan view of an interposer beam expander with a fiber interface that has a wider pitch than, and is perpendicular to, an interface to a second photonic chip.
Figure 12A:
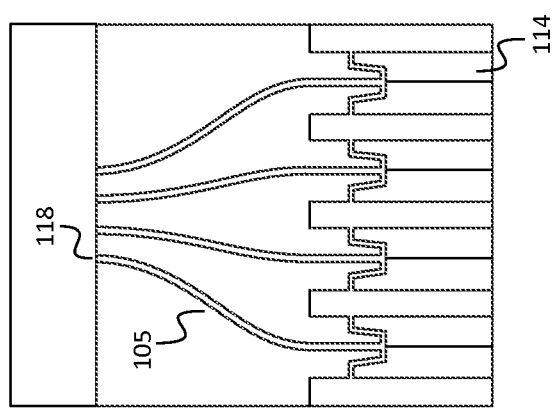
FIG. 12A is a plan view of an interposer beam expander with an array of waveguides having a wider pitch at a fiber interface than at an interface to a second photonic chip.

In some embodiments, the optical waveguides 105 are not straight but are curved, e.g., to provide a smaller-pitch interface to the second chip, as shown in FIG. 12A, or to provide an interface at right angles to the fiber interface, as shown in FIG. 12B. As mentioned above, the optical waveguide 105 may taper down to a width of 3 microns so that the curved portions of the optical waveguides 105 are 3 microns wide; the optical waveguide 105 may then widen again to a width of 12 or 13 microns at the chip-end waveguide facet 118. In one embodiment the pitch of the fiber array is 250 microns, and the pitch of the optical waveguide array at the interface to the second chip is 50 microns.

Although the interposer beam expander is illustrated in the drawings as having 4 or 8 optical channels (i.e., optical waveguides 105), it may have more or fewer optical channels, e.g., it may have one channel. Exemplary optical waveguide 105 dimensions are provided in this disclosure, but, as one of skill in the art will understand, an interposer beam expander may be fabricated with dimensions other than those disclosed herein. For example, in the embodiment of FIGS. 1A-1C, 2A, 2B, 4, 7, and 9, the cantilevered extension 410 has a thickness of 5 microns, including the oxide layer, and the central ridge has a thickness of 10 microns, including the oxide layer. FIGS. 1A-1C, 2A, 2B, 4, 7, and 9 are drawn to scale, and the embodiment they depict is an interposer beam expander with an overall length of 9.8 mm, an overall width of 2.8 mm, and an overall thickness (including the substrate and oxide layer) of 675 microns. The boundaries between the oxide layer and the substrate, and between the oxide layer and the silicon layer above it, are not shown in FIGS. 1A-1C, 2A, 2B, 4, 7, and 9.

Although the optical waveguides of exemplary embodiments described herein are ridge or "rib" waveguides, in other embodiments, as one of skill in the art will understand, an interposer beam expander may be fabricated using other waveguide structures such as strip waveguides or buried waveguides.

In one embodiment, a saw cut perpendicular to the direction of the V-grooves 114 is used to form an end surface in each V-groove 114 that is perpendicular to the V-groove 114. The absence of a sloping end wall which otherwise limits the insertion of the fiber in the V-groove 114 may make it unnecessary to have a cantilevered extension 410, and the fiber-end waveguide facet 116 may, in this embodiment, be at the saw-cut surface. In one embodiment the hard stop 710 is eliminated, the optical waveguides 105 extend to an edge of the interposer beam expander, and the edge is polished. It is then aligned by an active alignment process to the second chip (e.g., an alignment process in which the coupling between the waveguides is monitored during the alignment process, to insure adequate coupling); the second chip similarly has optical waveguides 105 extending to a polished edge. In this embodiment the two chips may or may not be inverted (or "flipped") relative to each other. Although the interposer beam expander is described above in exemplary embodiments as being constructed from silicon and silicon oxide, as one of skill in the art will understand the same concepts may be used to construct an interposer beam expander in another system such as InP, glass, GaAs, or LiNbO$_3$, together with appropriate methods and tools. For example if an anisotropic etch is not readily available for the system being used, a V-groove blade may be used instead, to fabricate V-grooves.

Although the function of the interposer beam expander is described in terms of light propagating out of an array of fibers, through the interposer beam expander, and into optical waveguides on the second chip, it will be understood by those of skill in the art that the interposer beam expander may equally well be employed for light propagating in the opposite direction (i.e., from the second chip, through the interposer beam expander, and into an array of fibers), or in different directions in different optical waveguides 105 of the interposer beam expander. A photonic chip constructed according to embodiments of the present invention need not have a first interface to an array of fibers and a second interface to an array of waveguides on a second chip, but may, for example, have only one of these interfaces, the other ends of the waveguides being connected, for example, to lasers or photodetectors, or it may have two interfaces to arrays of fibers, or two interfaces to waveguides on a second chip.

Although exemplary embodiments of an interposer beam expander chip have been specifically described and illustrated herein, many modifications and variations will be apparent to those skilled in the art. Accordingly, it is to be understood that an interposer beam expander chip constructed according to principles of this invention may be embodied other than as specifically described herein. The invention is also defined in the following claims, and equivalents thereof.

What is claimed is:

1. A photonic chip, comprising:
an optical waveguide on a top surface of the photonic chip, the optical waveguide having:
a first end configured to support a first optical mode having a first mode center;
a second end configured to support a second optical mode having a second mode center; and
a first tapered portion, the first tapered portion comprising a first tapered mesa and a tapered central ridge; and
a hard stop comprising a flat surface parallel to a portion of the optical waveguide at the second end of the optical waveguide,
the height of the second mode center above the flat surface of the hard stop being greater than zero and less than the thickness of the optical waveguide at the second end.

2. The photonic chip of claim 1, wherein the flat surface of the hard stop has an area of at least 0.5 mm$^2$.

3. The photonic chip of claim 2, wherein the flat surface of the hard stop is a single rectangular area.

4. The photonic chip of claim 1, wherein the second end of the optical waveguide has a thickness of about 3 microns.

5. The photonic chip of claim 1, wherein the second end of the optical waveguide has a width of about 13 microns.

6. The photonic chip of claim 1, wherein at least one of the first end and the second end of the optical waveguide comprises a flat facet, the angle between a normal vector of the facet and the direction of the optical waveguide, at the second end of the optical waveguide, being between 3 and 10 degrees.

7. The photonic chip of claim 6, wherein the facet is perpendicular to the top surface of the photonic chip.

8. The photonic chip of claim 1, further comprising an alignment feature, the alignment feature being a recessed feature in the hard stop.

9. The photonic chip of claim 1, further comprising a V-groove at the first end of the optical waveguide, the V-groove being configured to secure and support the cladding of an optical fiber such that a centerline of the optical fiber is substantially aligned with the first mode center.

10. The photonic chip of claim 9, further comprising a cantilevered extension supporting the first end of the optical waveguide above a sloping end surface of the V-groove.

11. The photonic chip of claim 1, wherein the first end of the optical waveguide comprises a T-bar, the T-bar having the same thickness as the optical waveguide, and being composed of the same material as the optical waveguide.

12. The photonic chip of claim 1, wherein the first end of the optical waveguide comprises a fork-bar having the same thickness as the optical waveguide, and being composed of the same material as the optical waveguide, the fork-bar comprising two tines configured to act as fiber stops.

13. The photonic chip of claim 1, wherein:
the first tapered portion has a first end and a second end, the first end of the first tapered portion being nearer than the second end of the first tapered portion to the first end of the optical waveguide; and
the tapered central ridge has a width that decreases from a first width at the first end of the first tapered portion to near zero at the second end of the first tapered portion.

14. The photonic chip of claim 13, wherein the first tapered mesa has a width that decreases from a second width at the first end of the first tapered portion to a third width, less than the second width, at the second end of the first tapered portion.

15. The photonic chip of claim 13, wherein the first end of the first tapered portion is configured to support an optical mode with a vertical mode size of about 8 microns and a horizontal mode size of about 8 microns.

16. The photonic chip of claim 13, wherein the optical waveguide further comprises a second tapered portion between the first tapered portion and the second end of the optical waveguide, the second tapered portion having a first end and a second end, the first end of the second tapered portion being nearer than the second end of the second tapered portion to the first end of the optical waveguide, the second tapered portion comprising a second tapered mesa.

17. The photonic chip of claim 16, wherein the second tapered mesa has a width that increases from the first end of the second tapered portion to the second end of the second tapered portion.

18. The photonic chip of claim 1 suitable for use as an interposer chip for coupling light between an array of fibers and an array of optical waveguides on a second photonic chip, each fiber configured to support the first optical mode and each optical waveguide of the second photonic chip configured to support the second optical mode;
the photonic chip comprising:
a first section for accommodating the array of fibers;
a second section comprising a plurality of waveguides for transforming the first optical mode from each fiber into the second optical mode for a respective waveguide on the second photonic chip; each waveguide of the second section comprising a first end, a second end and a first tapered portion; and
a third section for optical alignment to the second photonic chip, the third section comprising the hard stop.

19. A method, utilizing the photonic chip of claim 18 as an interposer chip, of coupling light between an array of fibers and an array of optical waveguides on a second photonic chip, each fiber configured to support the first optical mode and each optical waveguide configured to support the second optical mode; the method comprising:
coupling light from a fiber of the array of fibers into a first end of the photonic chip; and
coupling light from a second end of the photonic chip into an optical waveguide on the second photonic chip.

20. The method of claim 19, wherein the step of coupling light from the second end of the photonic chip comprises:
flipping the interposer chip onto the second photonic chip, wherein the hard stop of the photonic chip abuts against a mounting surface on the second photonic chip to align an optical waveguide on the interposer chip with an optical waveguide on the second photonic chip.

21. An assembly comprising:
a first photonic chip, comprising:
a first optical waveguide on a top surface of the first photonic chip, the first optical waveguide having:
a first end configured to support a first optical mode having a first mode center;
a second end configured to support a second optical mode having a second mode center; and
a first tapered portion, the first tapered portion comprising a first tapered mesa and a tapered central ridge; and
a hard stop comprising a flat surface parallel to a portion of the first optical waveguide at the second end of the first optical waveguide; and
a second photonic chip having a top surface comprising a second optical waveguide having a first end,
the height of the second mode center above the flat surface of the hard stop being greater than zero and less than the thickness of the first optical waveguide at the second end,
the first photonic chip being secured to the second photonic chip, the first photonic chip being substantially parallel to, and overlapping, the second photonic chip,
the flat surface of the hard stop of the first photonic chip abutting against a region of the top surface of the second photonic chip,
the first end of the second optical waveguide being configured to support a third optical mode having a third mode center,
a portion of the first optical waveguide at the second end of the first optical waveguide being substantially parallel to a portion of the second optical waveguide at the first end of the second optical waveguide, and
the second mode center being substantially aligned with the third mode center.

22. The assembly of claim 21, wherein the second photonic chip further comprises a hard stop having a flat surface parallel to the portion of the second optical waveguide at the first end of the second optical waveguide, and abutting against a region of the top surface of the first photonic chip.

23. The assembly of claim 22, wherein:
a gap between:
the first end of the first optical waveguide, and
the first end of the second optical waveguide
is wider than a gap between:
a boundary between the hard stop of the first photonic chip and the region of the top surface of the first photonic chip, and
a boundary between the hard stop of the second photonic chip and the region of the top surface of the second photonic chip.

24. The assembly of claim 21, wherein the first photonic chip is flip chip mounted onto the second photonic chip.

* * * * *